(No Model.) 3 Sheets—Sheet 2.

W. B. WILLIS.
ROTARY GANG PLOW.

No. 539,322. Patented May 14, 1895.

WITNESSES:
F. L. Ourand
W. L. Coombs

INVENTOR:
William B. Willis
by Lewis Dagger &c.
Attorneys.

(No Model.)
W. B. WILLIS.
ROTARY GANG PLOW.
No. 539,322.
3 Sheets—Sheet 3.
Patented May 14, 1895.
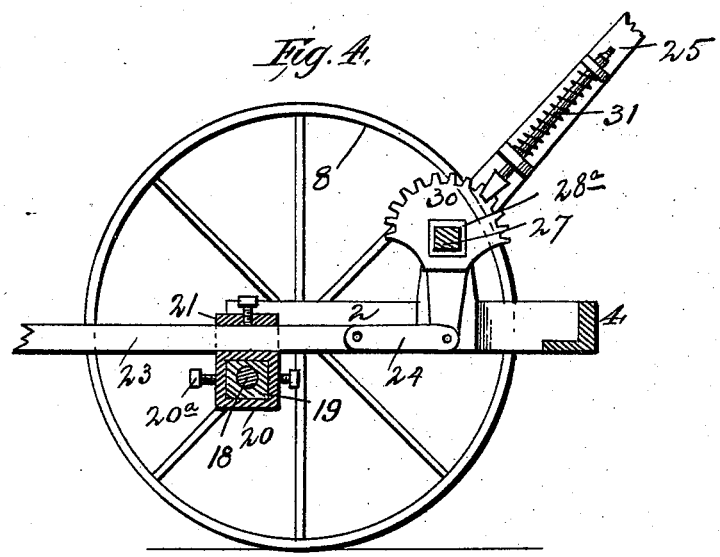
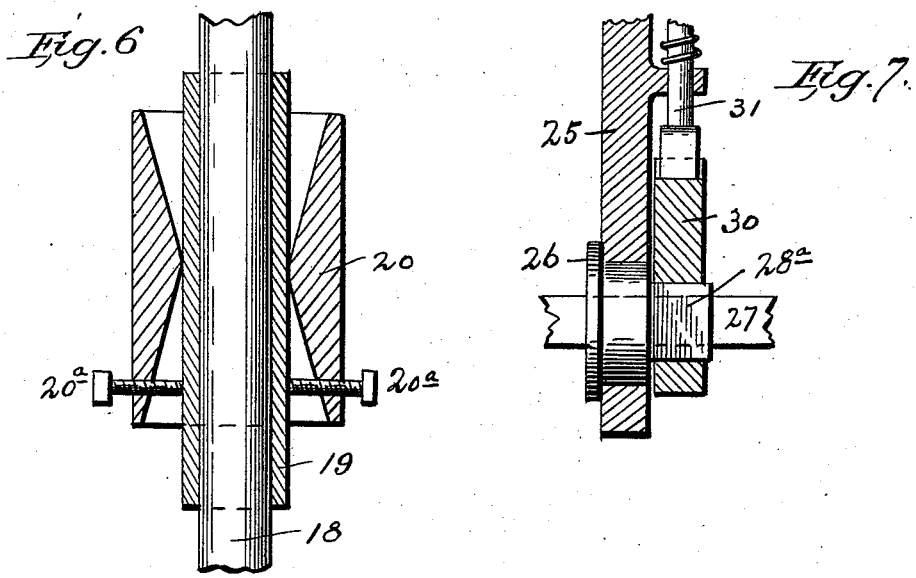
WITNESSES:
F. L. Ourand
W. L. Coombs
INVENTOR:
William B. Willis,
Louis Bagger & Co.
Attorneys.

UNITED STATES PATENT OFFICE.

WILLIAM BEALE WILLIS, OF WACO, TEXAS, ASSIGNOR OF ONE-HALF TO CHARLES BANISTER, OF SAME PLACE.

ROTARY GANG-PLOW.

SPECIFICATION forming part of Letters Patent No. 539,322, dated May 14, 1895.

Application filed August 14, 1894. Serial No. 520,237. (No model.)

*To all whom it may concern:*

Be it known that I, WILLIAM BEALE WILLIS, a citizen of the United States, and a resident of Waco, in the county of McLennan and State of Texas, have invented certain new and useful Improvements in Rotary Gang-Plows; and I do hereby declare that the following is a full, clear, and exact description of the invention, which will enable others skilled in the art to which it appertains to make and use the same, reference being had to the accompanying drawings, which form a part of this specification.

My invention relates to improvements in rotary gang-plows, and it consists in the novel construction and combination of parts hereinafter fully described and claimed.

Figure 1:
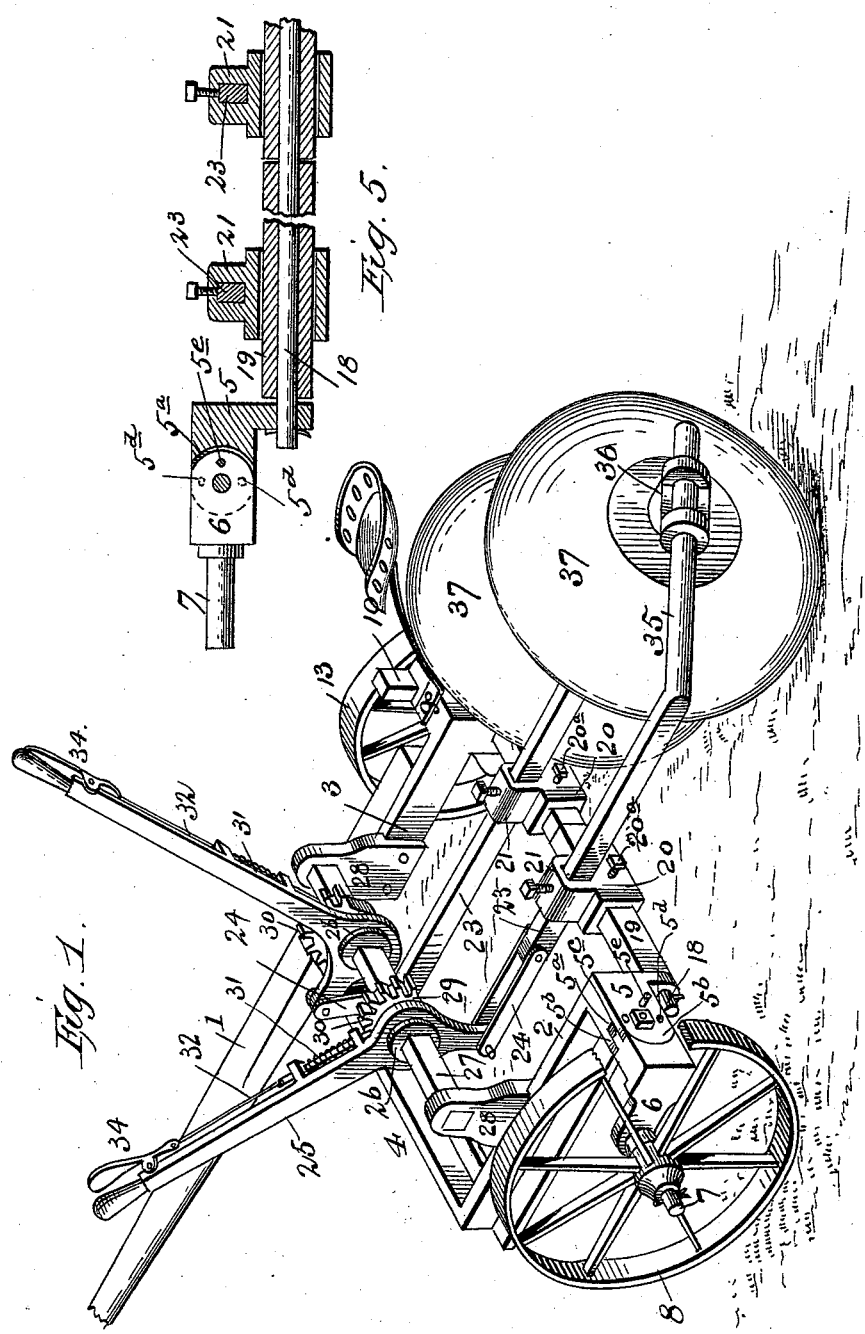
Figure 2:
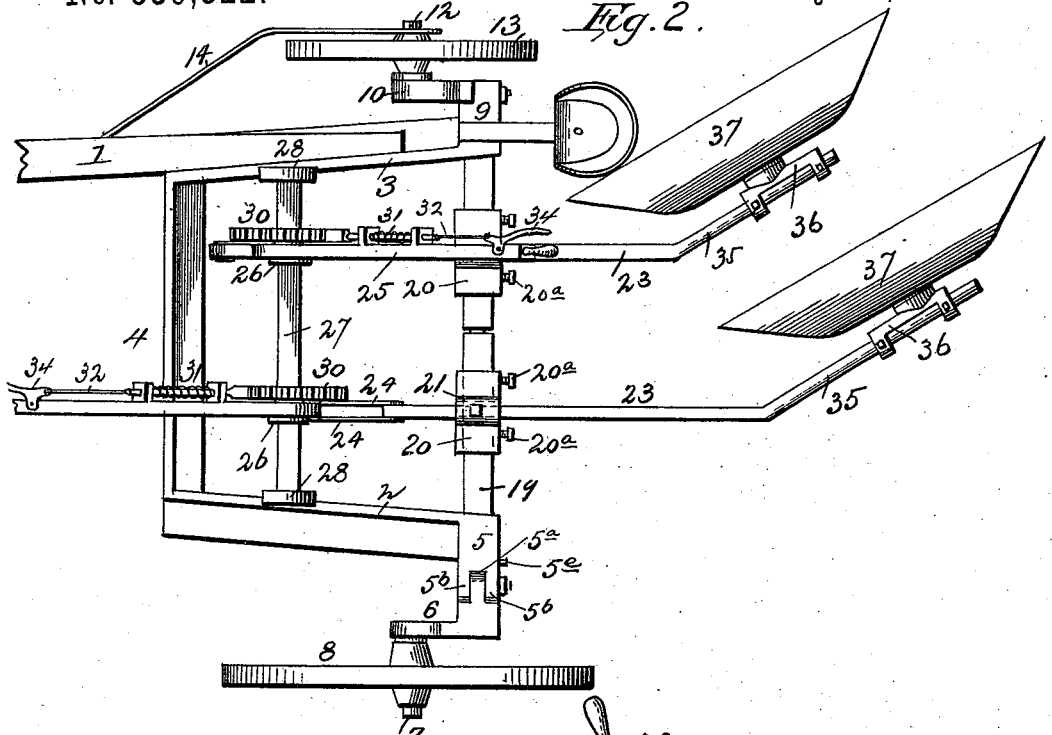
Figure 3:
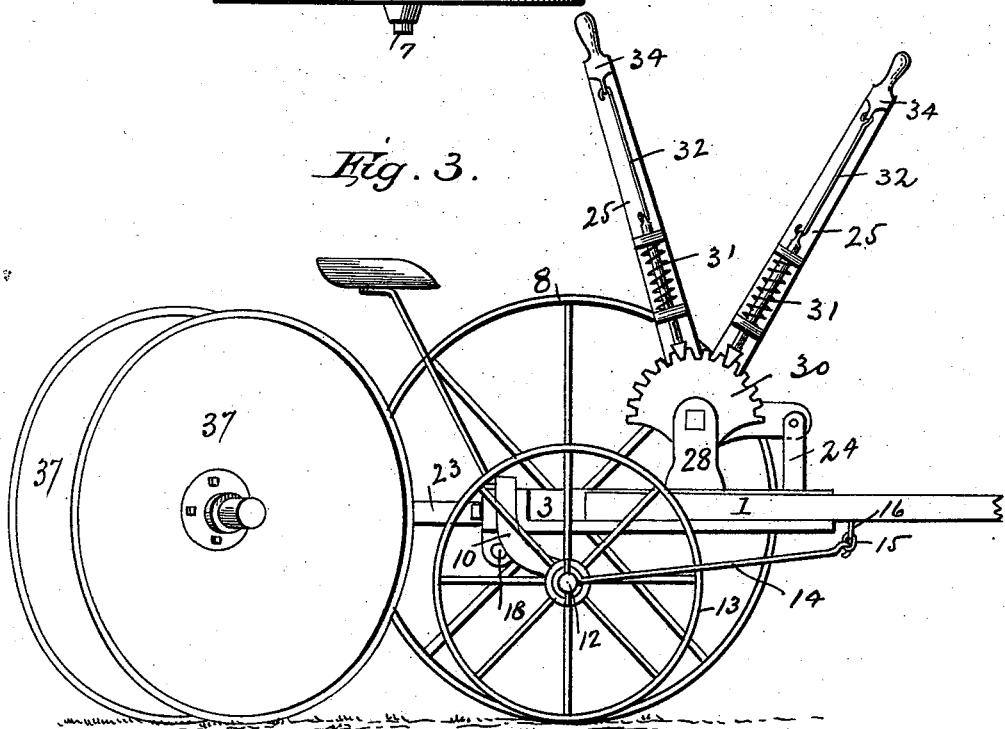

In the accompanying drawings, Figure 1 is a perspective view of a plow constructed in accordance with my invention. Fig. 2 is a plan view of the same. Fig. 3 is a side elevation. Fig. 4 is a longitudinal section on the line $x$ $x$, Fig. 1. Figs. 5, 6, and 7 are detail views.

In the said drawings, the reference numeral 1 designates the tongue to which is secured the frame consisting of the side angle bars 2 and 3, and front bar 4. Secured to the rear end of the side bar 2 is a laterally extending arm 5 the outer end of which is slotted at $5^a$, forming two lugs $5^b$. Pivoted to these lugs is a lug $5^c$ of a forwardly extending bracket 6, provided with an axle 7, to which is journaled the land-wheel 8. The lugs $5^b$ and $5^c$ are formed with a series of holes $5^d$, through which passes a pin $5^e$, for holding the bracket in position. To the rear end of the other side bar 3 is secured a laterally extending arm 9, provided with a curved bracket 10, having an axle 12, in which the small or furrow wheel 13 is journaled. Connected to this axle 12 is one end of a draft rod 14, which is curved to pass in front of the furrow wheel, and its other end connected with a link 15, passing through an eye 16, secured to the tongue. To this link is secured a rod 17 to which the draft animals are connected, thereby counterbalancing the side draft, and compelling the plow to follow the furrow.

Secured to the rear ends of the frame of the plow are lugs or ears through which passes a cylindrical rod 18 provided with angular sleeves 19 having circular recesses therein through which said rod passes, there being one of these sleeves for each plow beam. Mounted on said sleeves are rectangular castings 20 which are held in place thereon by set screws $20^a$ and secured to said castings are stirrups 21. These stirrups are formed with slots which taper from the center toward each end through which the plow beams 23 pass, fitting the castings or sleeves in the center, whereby a rocking movement is given thereto in shifting the plow to or from land. These stirrups are fastened to the sleeves in sets, and by which sets the angle of presentation of the disks, hereinafter described, to the land can be changed. It will be noted that the sleeves 19 are separated or parted, so that each plow can be worked separately.

The front ends of the beams are connected by means of links 24 with levers 25, having circular apertures which engage with collars 26, on an angular shaft 27 secured to brackets 28 mounted upon the side bar of the plow frame. These collars are provided with rectangular hubs or bosses $28^a$ with which engage segments 29 provided with rack-teeth 30. With these rack teeth engage spring-actuated dogs or pawls 31 on the levers provided with connecting rods 32 and hand-levers 34 by which they may be thrown out of engagement with the rack-teeth to allow the levers 25 to be operated.

The rear ends of the plow beams are provided with cylindrical extensions 35 at an angle thereto, upon which are journaled sleeves 36 carrying the disk 37. By this means a straight axle is provided for the disk 37 to revolve upon, which will permit of the disk to work closer together than upon a straight beam and angled axle. The sleeves 36 are also rotatable and slidable upon said journals, whereby the disks may be adjusted thereon, according to the condition of the land, and the requirements of the plow, and whereby, also, by moving the sleeves backward or forward, the width of the furrow is varied to a limited degree.

By pivoting the bracket which carries the axle of the land wheel in the manner described, the level of the plow can be preserved, when the furrow wheel is working in the furrow by withdrawing the pin $5^e$ and then pushing the top of the land wheel inwardly and then inserting the pin in the other holes $5^d$. This will also give increased width of tread and provide a firmer pressure against side draft.

It will be noticed that by constructing the plow beams as described, they are entirely independent of each other, the movement of one not in any manner depending upon or interfering with that of the other, which in practice will be found very valuable and important.

Having thus fully described my invention, what I claim is—

1. In a rotary gang plow, the combination with the laterally movable castings, provided with stirrups, of the horizontally movable plow beams working in said stirrups and having their rear ends bent at an angle, the axles connected therewith and the disks, substantially as described.

2. In a rotary gang plow, the combination with the frame, of the horizontally and laterally movable plow beams having their ends bent at an angle, forming cylindrical extensions, the adjustable sleeves mounted thereon, having axles, and the disks journaled on said axles, substantially as described.

3. In a rotary gang plow, the combination with the horizontally and laterally movable plow beams, having cylindrical extensions at an angle thereto, of the adjustable sleeves mounted on said extensions having axles, and the disks journaled thereon, substantially as described.

4. In a rotary gang-plow, the combination with the frame, the plow beams, the transverse rod, the laterally movable rectangular sleeves having circular recesses through which said rod passes, the castings adjustably secured to said sleeves, and the stirrups secured to said castings, of the plow beams passing through slots in said stirrups, the extensions thereof, the sleeves mounted on said extensions provided with journals, and the disks journaled on said journals, substantially as described.

5. In a rotary gang-plow, the combination with the rectangular transverse bar, the collars secured thereto, having angular hubs or bosses and the levers mounted on said collars and provided with spring-actuated dogs or pawls, of the segments mounted on said hubs or bosses having rack-teeth, the plow beams connected with said levers and the disks connected with said beams, substantially as described.

6. In a rotary gang plow, the combination with the frame, the laterally movable castings, provided with stirrups, the horizontally movable plow beams and the disks connected therewith, of the bracket secured to the furrow side of the frame having a forwardly extending arm and a laterally extending axle, the tongue, the draft bar connected with the outer end of said lateral axle, the link and the eye in the tongue, substantially as described.

7. In a rotary gang plow, the combination with the frame, the laterally movable castings provided with stirrups, the horizontally movable plow beams and the disks connected therewith, of the bracket pivoted to the frame, having a forwardly extending arm and a laterally extending axle, and the land wheel journaled on said axle, substantially as described.

In testimony that I claim the foregoing as my own I have hereunto affixed my signature in presence of two witnesses.

WILLIAM BEALE WILLIS.

Witnesses:
O. L. STRIBLING,
S. P. ROSS.